United States Patent
Costecalde

(10) Patent No.: US 8,438,146 B2
(45) Date of Patent: May 7, 2013

(54) GENERATING CONTAINERS FOR ELECTRONIC RECORDS BASED ON CONFIGURABLE PARAMETERS

(75) Inventor: Jean-Marc Costecalde, Irvine, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/174,139

(22) Filed: Jun. 30, 2011

(65) Prior Publication Data
US 2013/0007064 A1 Jan. 3, 2013

(51) Int. Cl.
*G06F 17/30* (2006.01)
(52) U.S. Cl.
USPC ............ 707/705; 707/790; 707/821; 707/829
(58) Field of Classification Search .................. 707/705, 707/790, 821, 829
See application file for complete search history.

(56) References Cited

U.S. PATENT DOCUMENTS

| | | | |
|---|---|---|---|
| 6,236,994 B1* | 5/2001 | Swartz et al. ................. | 707/635 |
| 2005/0005235 A1* | 1/2005 | Satterfield et al. ............ | 715/519 |
| 2006/0218201 A1 | 9/2006 | Hsu et al. | |
| 2007/0033200 A1* | 2/2007 | Gillespie ........................ | 707/100 |
| 2007/0088736 A1* | 4/2007 | DeBie ............................ | 707/102 |
| 2007/0260575 A1* | 11/2007 | Robinson et al. .................. | 707/1 |
| 2008/0154956 A1* | 6/2008 | DeBie ......................... | 707/104.1 |
| 2008/0154969 A1* | 6/2008 | DeBie ............................ | 707/200 |
| 2008/0154970 A1* | 6/2008 | DeBie ............................ | 707/200 |
| 2008/0201366 A1 | 8/2008 | Devarakonda et al. | |
| 2009/0106155 A1* | 4/2009 | Castellanos et al. ............ | 705/51 |
| 2009/0222294 A1 | 9/2009 | Dick et al. | |
| 2010/0131509 A1 | 5/2010 | Acharya | |

* cited by examiner

*Primary Examiner* — Hanh Thai
(74) *Attorney, Agent, or Firm* — Patterson & Sheridan, LLP

(57) ABSTRACT

Embodiments of the invention may provide an approach for managing electronic records in a content management system. The content management system may use a container structure to create, edit, and manage electronic records in a coordinated way. The container structure may include a master container and a plurality of sub-containers. An associated method generally may include receiving a request comprising a record and one or more properties associated with the record; determining, from the one or more properties associated with the record, a date; based on the date of the record, associating the record with a sub-container of the container structure; and managing disposition of the sub-container based on an associated policy.

22 Claims, 8 Drawing Sheets

GENERATING CONTAINERS FOR ELECTRONIC RECORDS BASED ON CONFIGURABLE PARAMETERS

BACKGROUND

Embodiments of the invention are directed to techniques for managing electronic records in an enterprise environment. More specifically, embodiments of the invention provide a content management tool configured to automatically generate containers and place records in an appropriate container based on configurable parameters.

Organizations use content management systems to manage large amounts of electronic records. A content management system enables users to access, modify, and share records according to various defined rules. For example, a content management system may control access to records based on user roles. Moreover, a content management system may enable a user to process records in various ways without having to determine the physical location of such records. Furthermore, a content management system may facilitate communication among users for record processing and may simplify storage of record metadata. Additionally, a content management system may eliminate unnecessary record duplications.

Organizations generally have a record retention policy. Such a retention policy may specify a retention period for retaining (and disposing of) records subject to the policy. Organizations frequently automatically handle the processing of records according to a retention policy. Record processing may involve adding new records, browsing currently stored records, updating records, and disposing of records. While some content management systems may enforce a retention policy that evaluates records individually, such approach may require substantial computing time to process a large set of records.

SUMMARY

Embodiments of the invention may be used to create, edit, and manage electronic records in a coordinated way. One embodiment of the invention includes a method for managing records in a content management system. The method generally may include receiving a request comprising a record and one or more properties associated with the record; determining, from the one or more properties associated with the record, a date; based on the date of the record, associating the record with a sub-container of a container structure, wherein the container structure includes a master container and a plurality of sub-containers; and managing disposition of the sub-container based on an associated policy.

In a particular embodiment, the step of associating the record of a sub-container may include evaluating the date of the record to determine whether the date is valid. Upon determining that the date of the record is invalid, the method further may include associating the record with a transit sub-container among the plurality of sub-containers. Upon determining that the date of the record is valid, the method further may include associating the record with any sub-container among the plurality of sub-containers having a date range that includes the date of the record. Upon determining that there is no sub-container among the plurality of sub-containers having a date range that includes the date of the record, the method further may include creating a new sub-container among the plurality of sub-containers and associating the record with the new sub-container.

Additional embodiments include a computer-readable storage medium storing an application, which, when executed on a processor, performs the above recited method as well as a system having a processor and a memory storing a content management application program, which, when executed on the processor, performs the above recited method.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1:
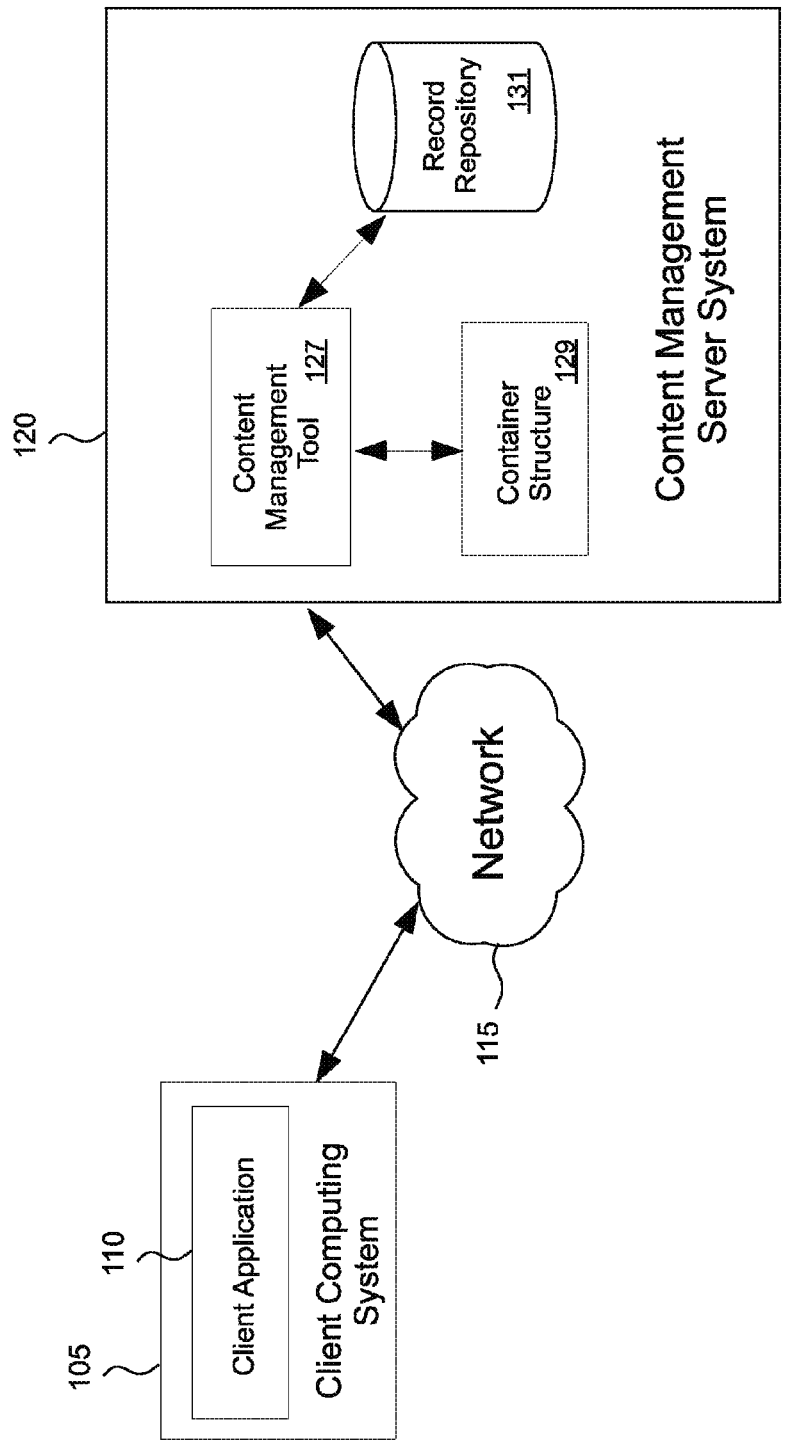
FIG. 1 illustrates a computing infrastructure used to manage records for one or more client systems, according to one embodiment of the invention.

Embodiments of the invention provide techniques for managing records in a content management system. In one embodiment, a content management tool may enforce a retention policy that automatically generates containers for records and places records in appropriate containers based on configurable parameters. In one embodiment, the content management tool may create and maintain a container structure. The container structure may comprise a master container and a collection of sub-containers. Each container is associated with a group of records managed by the content management tool. Container parameters are specified for the container structure, including time parameters, a date type parameter, and life cycle parameters. A user may configure the container parameters to address the needs of a particular case.

The content management tool may associate a record with a sub-container by reading a date in the record and filing the record in an appropriate sub-container. When a user presents a record for filing, the content management tool determines a filing date in the record according to the specified date type parameter and files the record into an appropriate sub-container according to the specified time parameters. If a sub-container corresponding to the date does not exist, the content management tool may create an appropriate sub-container. If the record does not have a valid filing date, the content management tool files the record in a "transit" sub-container until an appropriate filing date is specified for the record. The content management tool may store the filed record in a record repository.

The time parameters may determine when (and if) the content management tool generates a new sub-container. The content management tool generates sub-containers according to the time parameters only as needed. Accordingly, the content management tool does not generate a sub-container until a record is filed within the date range applicable to such sub-container. The time parameters may determine the date range for a new sub-container generated by the content management tool. The date type parameter may determine which date associated with a record is used by the content management tool to file the record. Thus, if multiple dates are associated with a record, the date type parameter may determine which, if any, of these dates is used to file the record. The life cycle parameters may define a retention period for the various sub-containers. Specifically, the life cycle parameters may specify a time period for retaining a sub-container from the beginning of its life cycle. Following the retention period, the sub-container may be disposed of (i.e., deleted from the container structure). Moreover, the life cycle parameters may specify one or more conditions for determining the length of a sub-container retention period.

If the filing date of a record changes such that the record no longer belongs in the sub-container in which it is currently filed, the content management tool re-files the record in another sub-container according to the time parameters. If such sub-container has not been created, the content management tool creates a new sub-container prior to re-filing the record. Moreover, in response to a browse request referencing a sub-container, the content management tool returns only records from the referenced sub-container. In response to a browse request referencing the master container, the content management tool returns records from each sub-container. Furthermore, records are disposed of according to the specified life cycle parameters.

Embodiments of the invention eliminate the need for a user to manually specify the location of records or to iterate through records to browse, process, or dispose of records. Further, the content management tool supports more efficient browsing or processing of records. Since each sub-container of a container structure is associated with records within a date range as specified by the time parameters, the content management tool returns records within a specified date range in response to a browse or process inquiry. Moreover, the content management tool supports simultaneous disposition of a group of records based on a date range. Since each record associated with a sub-container has a retention period specified by the sub-container, all records associated with the sub-container may be disposed of collectively.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium or, alternatively, a computer readable signal medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, or the like and conventional procedural programming languages such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, the content management tool may be deployed to a computing cloud (whether the cloud itself is provided by the enterprise or a third party). For example, the content management tool may manage cloud-based database systems, virtual machines, and a variety of other server applications.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, particular embodiments of the invention describe a content management system for managing records according to a retention policy. However, it should be understood that the techniques described herein may be adapted to a variety of purposes in addition to the uses for enforcing a record retention policy. Accordingly, references to the specific embodiments are included to be illustrative and not limiting.

FIG. 1 illustrates a computing infrastructure 100 used to manage records in a content management system, according to one embodiment of the invention. As shown, the computing infrastructure 100 includes a client computing system 105 and a content management server system 120, each connected to a communications network 115. An example of the content management server system 120 includes the IBM® FileNet® P8 Platform.

Illustratively, the client computing system 105 includes a client application 110 used to communicate with the content management server system 120 over the network 115 in order to file new records or browse existing records in the content management server system 120. Although shown as a single client computing system, the client computing system 105 is included to be representative of a single client or multiple clients. The content management server system 120 includes a content management tool 127 for maintaining a container structure 129. In one embodiment, the container structure 129 includes a master container, which may be associated with multiple sub-containers. Moreover, the content management server system 120 includes a record repository 131 for storing records filed by the content management tool 127 in the container structure 129. The record repository 131 includes a file system along with a collection of metadata stored in a relational database.

The content management tool 127, the container structure 129, and the record repository 131 enable the content management server system 120 to create, edit, and manage records in a coordinated way. The content management tool 127 may "check in" and "check out" records from the record repository 131 according to requests from a user of the client computing system 105. Moreover, as described in further detail below, the content management tool 127 enforces a record retention policy at the front end by associating records with sub-containers in the container structure 129. The container structure 129 enables the content management tool 127 to dispose of all records associated with a sub-container once a retention period for the sub-container has lapsed, thus eliminating the need to dispose of each record individually. Further, the container structure 129 enables the content management tool 127 to browse or process each record associated with a sub-container without searching for an individual record.

Figure 2:
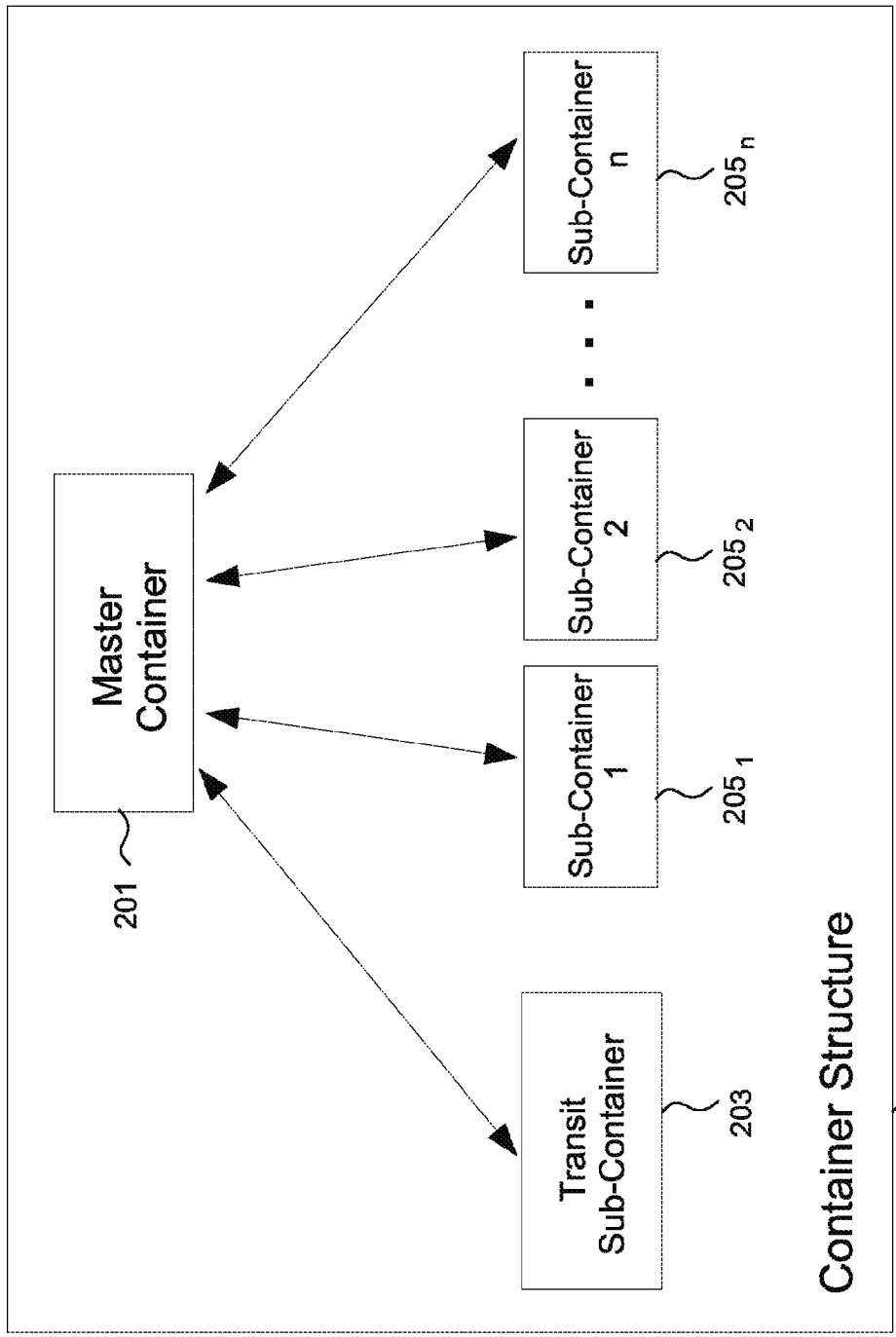
FIG. 2 illustrates a container structure, according to one embodiment of the invention.

FIG. 2 illustrates an example of the container structure 129. The container structure 129 may include a master container 201. The master container may be associated with sub-containers 205 (e.g., sub-containers 205₁ through 205ₙ). Each of the sub-containers 205 may be associated with records within a specified date range. The master container 201 also may be associated with a transit sub-container 203. The transit sub-container 203 may be associated with records without a valid date for record management purposes.

A user of the client computing system 105 may specify container parameters for the container structure 129. Using the client application 110, the user may send a record filing or processing request to the content management server system 120 via the network 115. The content management tool 127 may associate a record with a sub-container by reading a date in the record and filing the record in an appropriate sub-container. The content management tool 127 may file the record based on the container parameters specified by the user.

In one embodiment, the content management tool 127 creates sub-containers 205 as needed. For example, if a sub-container corresponding to the filing date of the record does not exist within the container structure 129, then the content management tool 127 creates a new sub-container 205. If the record does not have a valid filing date, the content management tool 127 may file the record in the transit sub-container 203 until an appropriate filing date is specified for the record. The content management tool 127 may store the filed record in the record repository 131.

If the filing date of a record changes such that the record no longer belongs in the sub-container in which it is currently filed, the content management tool 127 may re-file the record in another sub-container. If such sub-container has not been created, the content management tool 127 may create a new sub-container 205 prior to re-filing the record. Moreover, when a user requests records, the content management tool 127 may return records associated with one or more sub-containers 205 according to criteria specified by the user. Furthermore, records filed in the respective sub-containers 205 may be disposed of according to the container parameters specified for the container structure 129.

Figure 3:
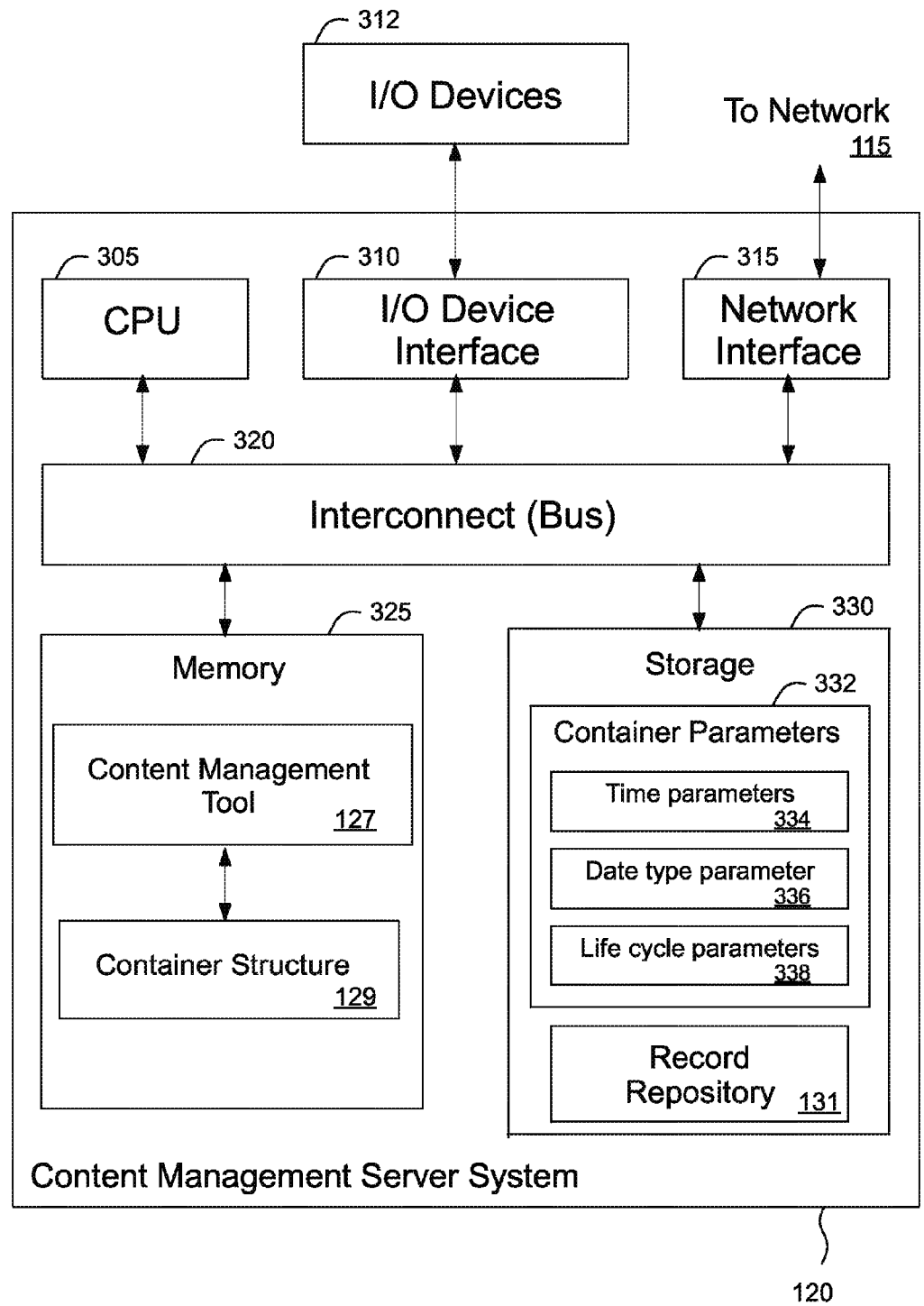
FIG. 3 illustrates a content management server system used to file and manage records for requesting clients, according to one embodiment of the invention.

FIG. 3 illustrates an example of the content management server system 120 configured to manage records, according to one embodiment of the invention. As shown, the content management server system 120 includes, without limitation, a central processing unit (CPU) 305, a network interface 315, an interconnect 320, a memory 325, and storage 330. The content management server system 120 also may include an I/O device interface 310 connecting I/O devices 312 (e.g., keyboard, display, and mouse devices) to the server system 120.

The CPU 305 retrieves and executes programming instructions stored in the memory 325. Similarly, the CPU 305 stores and retrieves application data residing in the memory 325. The interconnect 320 facilitates transmission, such as of programming instructions and application data, among the CPU 305, I/O devices interface 310, storage 330, network interface 315, and memory 325. CPU 305 is included to be representative of a single CPU, multiple CPUs, a single CPU having multiple processing cores, and the like. Additionally, the memory 325 is generally included to be representative of a random access memory. Furthermore, the storage 330 may be a disk drive storage device. Although shown as a single unit, the storage 330 may be a combination of fixed and/or removable storage devices, such as fixed disc drives, floppy disc drives, tape drives, removable memory cards or optical storage, network attached storage (NAS), or a storage area-network (SAN).

As shown, the memory 325 includes the content management tool 127 and the container structure 129. The storage 330 includes the record repository 131 and container parameters 332 specified for the container structure 129. Illustratively, the container parameters 332 include time parameters 334, a date type parameter 336, and life cycle parameters 338. The container parameters 332 may be configurable by the user of the client computing system 105.

The time parameters 334 may determine when (and if) the content management tool 127 generates a new sub-container 205. The content management tool 127 generates sub-containers according to the time parameters on an "as needed" basis. That is, the content management tool 127 does not generate a sub-container for a particular date range until a record is filed within the date range applicable to such sub-container. The time parameters 334 may determine the date range for a new sub-container 205 created by the content management tool. The date range may be defined using a duration parameter and a starting point parameter. The duration parameter may specify the duration of a new sub-container (e.g., day-long, month-long, year-long). The starting point parameter may specify a starting date of a new sub-container (e.g., Oct. 1, 2011). The duration parameter and the starting point parameter may ensure that the respective date ranges of the sub-containers 205 do not overlap. Records with a filing date prior to the starting date may be filed in the transit sub-container 203. Thus, the date range of the transit sub-container 203 may include any date prior to the starting date specified by the starting point parameter.

The content management tool 127 may use the duration parameter and starting point parameters jointly. For example, if the user specifies a monthly duration and a starting date of October 1, then the content management tool 127 generates sub-containers with a month-long duration, starting with Oct. 1, 2011, as needed. Thus, if the user presents a record with a filing date of Oct. 15, 2011, and a sub-container with a date range including the date of the record does not exist, then the content management tool 127 creates a sub-container 205 with a date range from Oct. 1, 2011 to Oct. 31, 2011. Similarly, if the user presents a record with a filing date of Nov. 5, 2011, and a sub-container with a date range including the date of the record does not exist, then the content management tool 127 creates a sub-container 205 with a date range from Nov. 1, 2011 to Nov. 31, 2011. When the user presents a record with a filing date of Jun. 1, 2011, the content management tool 127 determines that the record has a filing date prior to the specified starting date. Accordingly, the content management tool 127 determines that the filing date for the record is invalid and files the record in the transit sub-container 203.

The date type parameter 336 may determine which date associated with a record the content management tool 127 uses as the filing date for the record. Thus, if multiple dates are associated with a record, the date type parameter may determine which, if any, of these dates to use when filing the record in the container structure 129. For example, the date type parameter 336 could specify that the content management tool 127 use the creation date associated with a record to file all records in the container structure 129. In this example, if the user presents a record for filing with a creation date of Oct. 5, 2011 and an end-of-contract date of Nov. 11, 2011, then the content management tool 127 uses the creation date of Oct. 5, 2011 as the filing date. In another example, the date type parameter 336 could specify that the content management tool 127 use the end-of-contract date associated with a record to file all records in the container structure 129. In this example, if the user of the client computing system 105 presents a record for filing with a creation date of Oct. 5, 2011 and an end-of-contract date of Nov. 11, 2011, then the content management tool 127 uses the end-of-contract date of Nov. 11, 2011 as the filing date.

The date type parameter 336 ensures that records are filed according to a consistent date type. In another example, the date type parameter 336 could specify that the content management tool 127 use the end-of-contract date associated with a record to file all records in the container structure 129. In this example, if the user presents a record for filing with a creation date of Oct. 5, 2011, but does not specify a valid end-of-contract date, then according to the date type parameter 336 no valid filing date has been provided for the record. Thus, in this case the record is filed in the transit sub-container 203 of the container structure 129.

The life cycle parameters 338 may define the retention period for each of the sub-containers 205. A retention period of a sub-container is a time period for retaining a sub-container from the beginning of its life cycle. Following the retention period, the sub-container (and the records associated with that sub-container) may be disposed of (i.e., deleted from the container structure 129). For example, the life cycle parameters 338 may specify to retain a sub-container for two years from the beginning of its life cycle. The life cycle parameters 338 also may specify one or more conditions for determining the length of a sub-container retention period. Furthermore, the life cycle parameters 338 may specify a retention period for the transit sub-container 203. In one embodiment, the life cycle parameters 338 may specify that the transit sub-container 203 be retained indefinitely.

Figure 4:
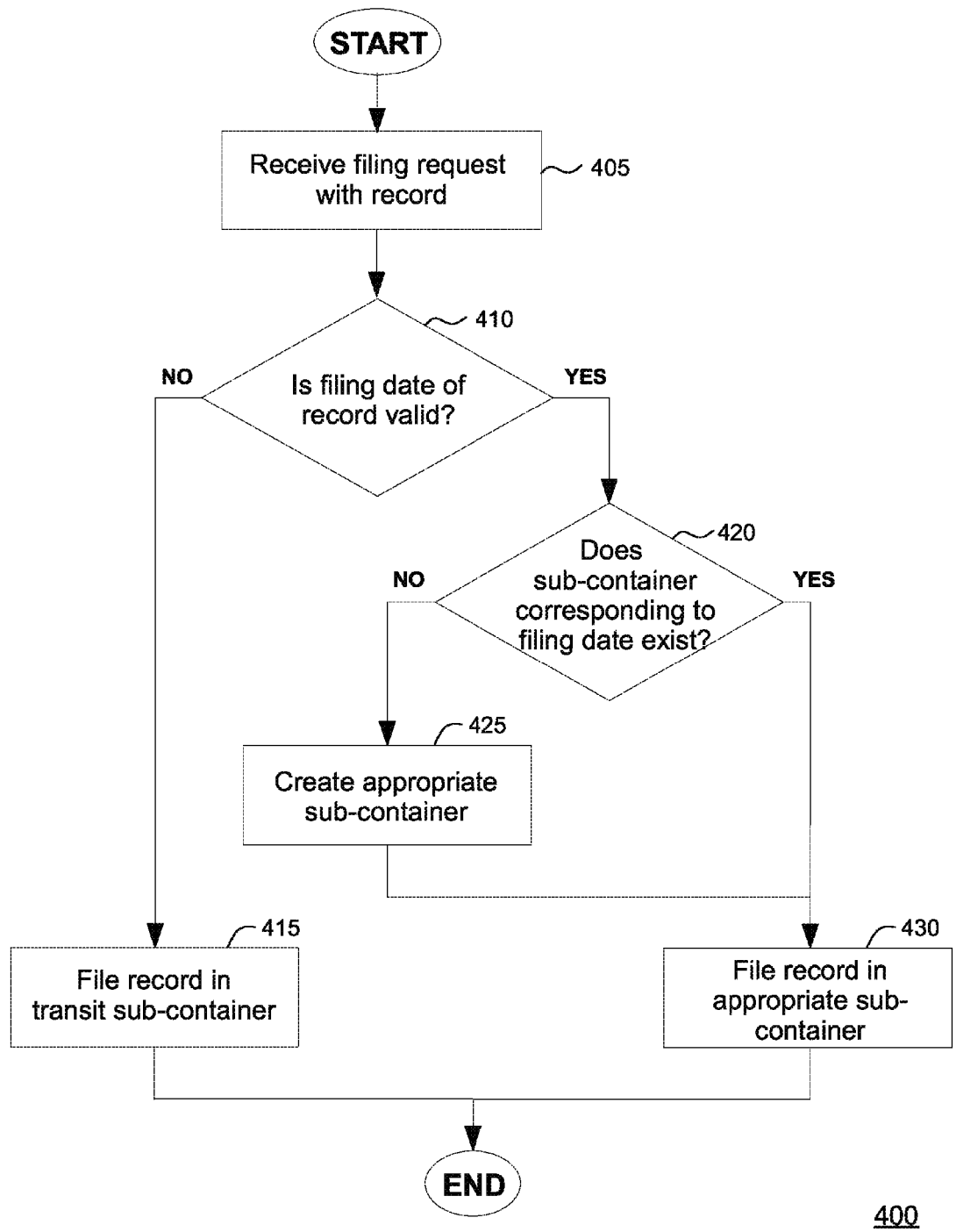
FIG. 4 illustrates a method for filing a record into a container structure, according to one embodiment of the invention.

FIG. 4 illustrates a method 400 for filing a record into a container structure, according to one embodiment of the invention. As shown, the method begins at step 405, where a content management server system receives a request to file a record from a client computing system. The request may include the record itself and one or more associated properties, including creation date, end-of-contract date, etc. At step 410, a content management tool of the server system determines whether a valid filing date is provided for the record. The filing date used by the content management tool may be determined by the date type parameter associated with the container structure. If a valid filing date is not provided, then at step 415 the content management tool files the record in the transit sub-container of the container structure.

If the content management tool determines at step 410 that a valid filing date is provided, then at step 420 the content management tool determines whether a sub-container in the container structure corresponds to the filing date. For example, the content management tool may determine whether a sub-container in the container structure has a date range that includes the filing date. If there is a sub-container corresponding to the filing date, then the method proceeds to step 430. If there is no sub-container corresponding to the filing date, then at step 425 an appropriate sub-container is created for the record according to the time parameters specified for the container structure. At step 430 the content management tool files the record in the appropriate sub-container of the container structure. In addition to filing the record according to method 400, the record may be stored in a record repository of the content management server system.

Figure 5:
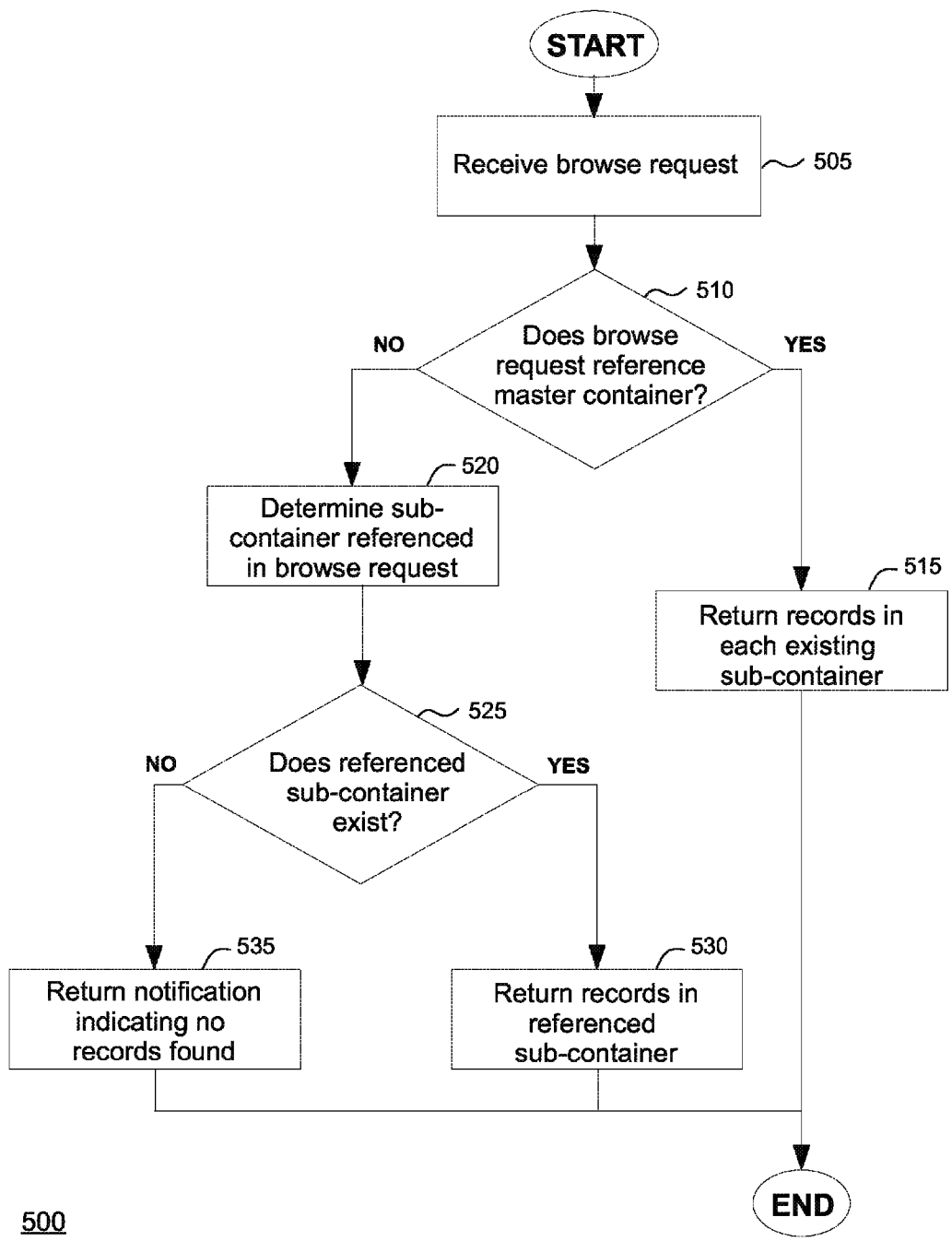
FIG. 5 illustrates a method for browsing records in a container structure, according to one embodiment of the invention.

FIG. 5 illustrates a method 500 for browsing records in a container structure, according to one embodiment of the invention. As shown, the method begins at step 505, where a content management server system receives a browse request from a client computing system. At step 510, the content management tool of the server system determines whether the browse request references the master container of the container structure. To determine whether the browse request references the master container, the content management tool may determine whether one or more properties associated with the master container are present in the request. If the browse request references the master container, then at step 515 the content management tool returns to the client computing system the records filed in each existing sub-container.

If the content management tool determines at step 510 that the browse request does not reference the master container (i.e., if the tool determines that the browse request references a particular sub-container), then at step 520 the tool determines the sub-container referenced in the browse request. At step 525 the content management tool determines whether the sub-container referenced in step 520 exists. If the referenced sub-container exists, then at step 530 the content management tool returns to the client computing system the records filed in the referenced sub-container. If the referenced sub-container does not exist, then at step 535 the content management tool returns a notification to the client computing system indicating that no records were found in the container structure satisfying the browse request. According to the method 500, the content management tool supports more efficient browsing or processing of records. Since each sub-container stores records within a date range as specified by time parameters, the content management tool returns records within a specified date range in response to a browse or process inquiry.

Figure 6A:
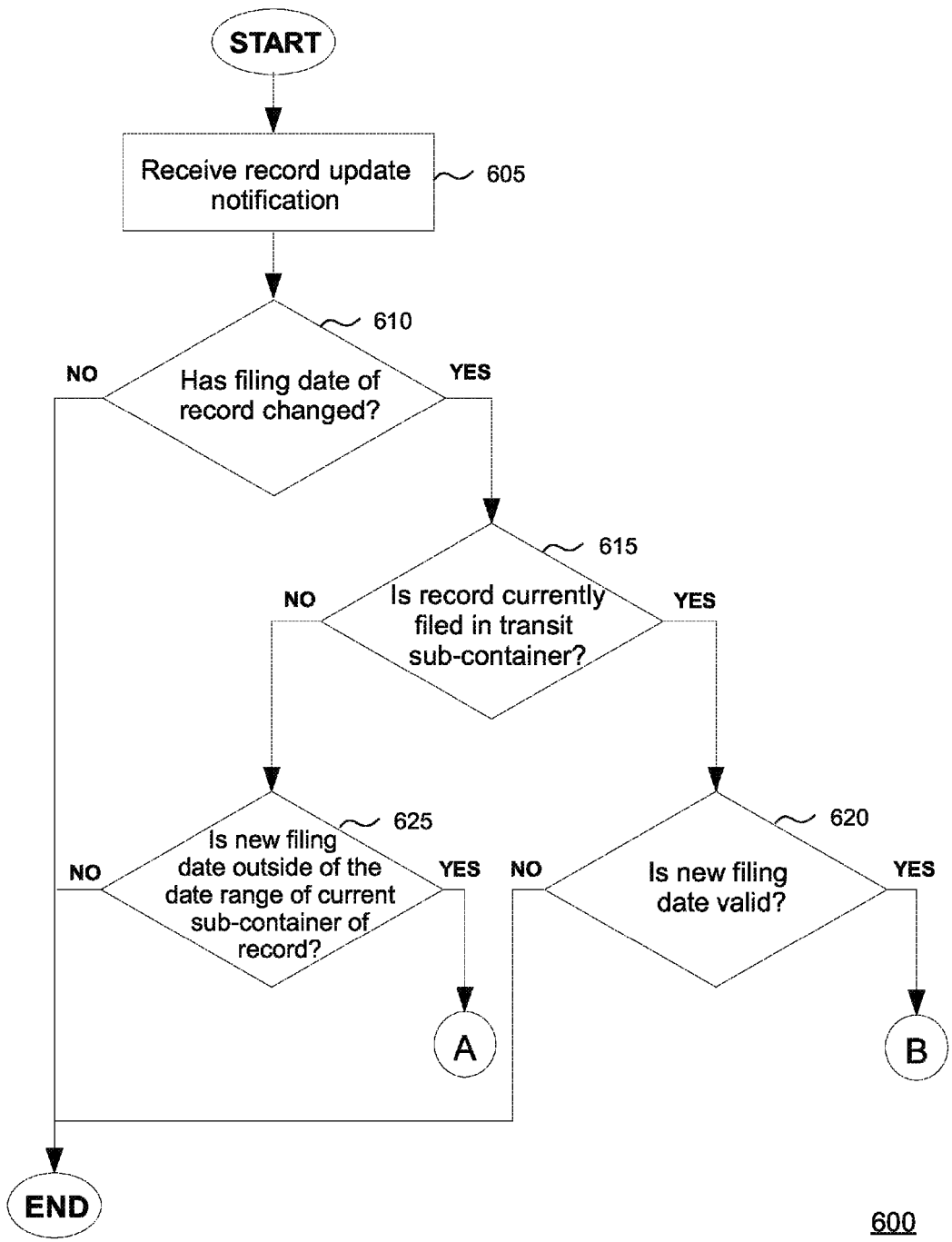
FIGS. 6A and 6B illustrate a method for updating records in a container structure, according to one embodiment of the invention.
Figure 6B:
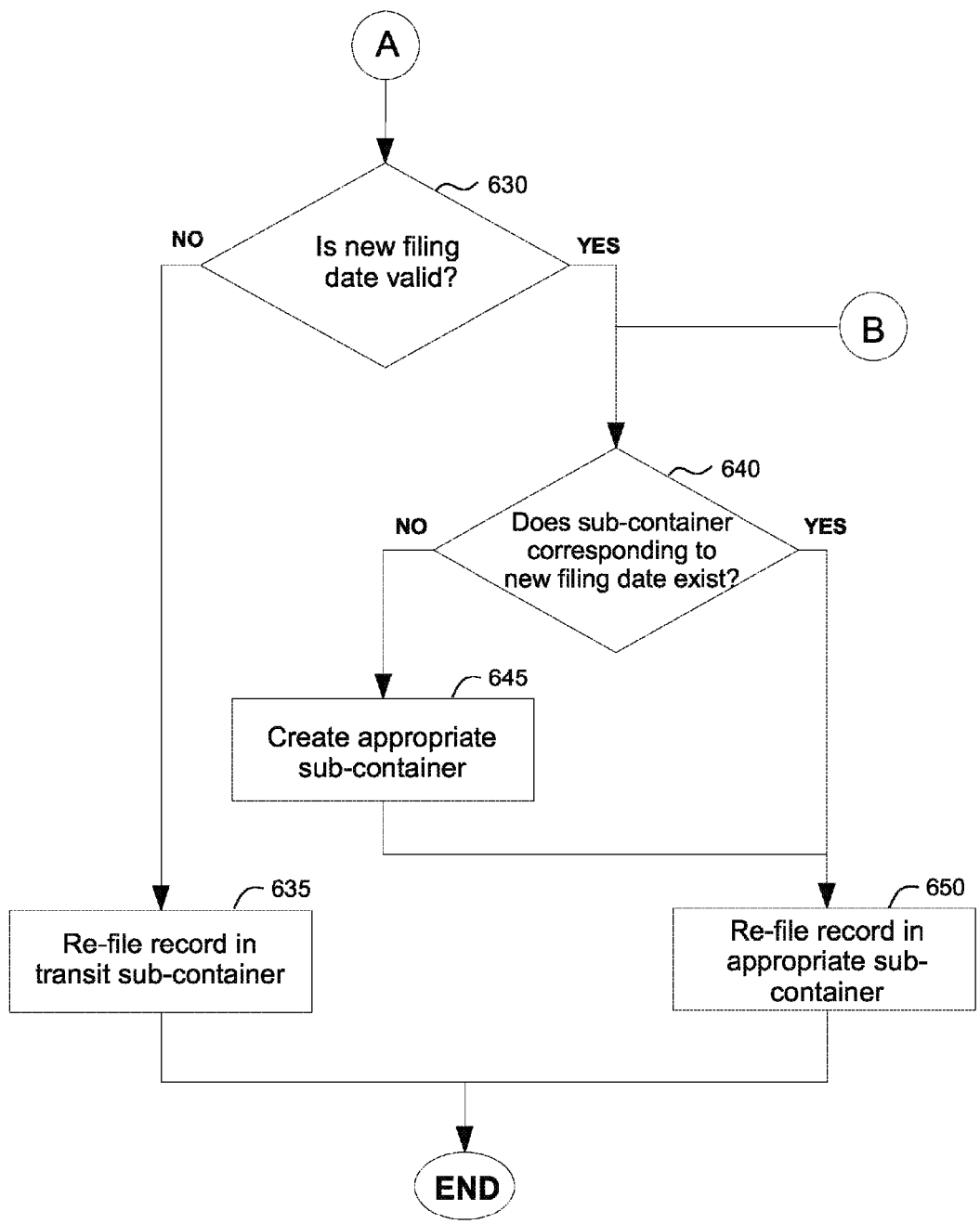

FIGS. 6A and 6B illustrate a method 600 for updating records in a container structure, according to one embodiment of the invention. As shown in FIG. 6A, the method begins at step 605, where a content management tool receives a record update notification from a client computing system. The update may result from a change in the filing date or another property of the record. At step 610, the content management tool determines whether the filing date of the record has changed as a result of the update. If the filing date of the record has not changed, then the method ends, as the record remains filed in the sub-container in which it is currently filed. If the filing date of the record has changed, then at step 615 the content management tool determines whether the record is currently filed in the transit sub-container of the container structure. If the record is currently filed in the transit sub-container, then at step 620 the content management tool determines whether the new filing date is valid. If the new filing date is not valid, then the process ends, as the record remains filed in the transit sub-container. If the new filing date is valid, then the method proceeds to step 640.

If at step 615 the content management tool determines that the record is not currently filed in the transit sub-container (i.e., the record is currently filed in a sub-container), then at step 625 the content management tool determines whether the new filing date is outside of the date range of the sub-container in which the record is currently filed. If the new filing date is not outside of the date range, then the method 600 ends, as the record remains filed in its current sub-container. If the new filing date is outside of the date range, then at step 630 the content management tool determines whether the new filing date is valid, as shown in FIG. 6B. If the new filing date is invalid, then at step 635 the record is re-filed in the transit sub-container.

If the content management tool determines at step 630 that the new filing date is valid, then at step 640 the content management tool determines whether a sub-container in the container structure corresponds to the new filing date. For example, the content management tool may determine whether a sub-container has a date range that includes the new filing date. If there is a sub-container corresponding to the new filing date, then the method proceeds to step 650. If no sub-container has been created for the new filing date, then at step 645 an appropriate sub-container is created for the updated record according to the time parameters specified for the container structure. At step 650 the content management tool re-files the record in the appropriate sub-container of the container structure. In addition to processing the record according to the method 600, an updated copy of the record may be stored in a record repository of the content management server system.

Figure 7:
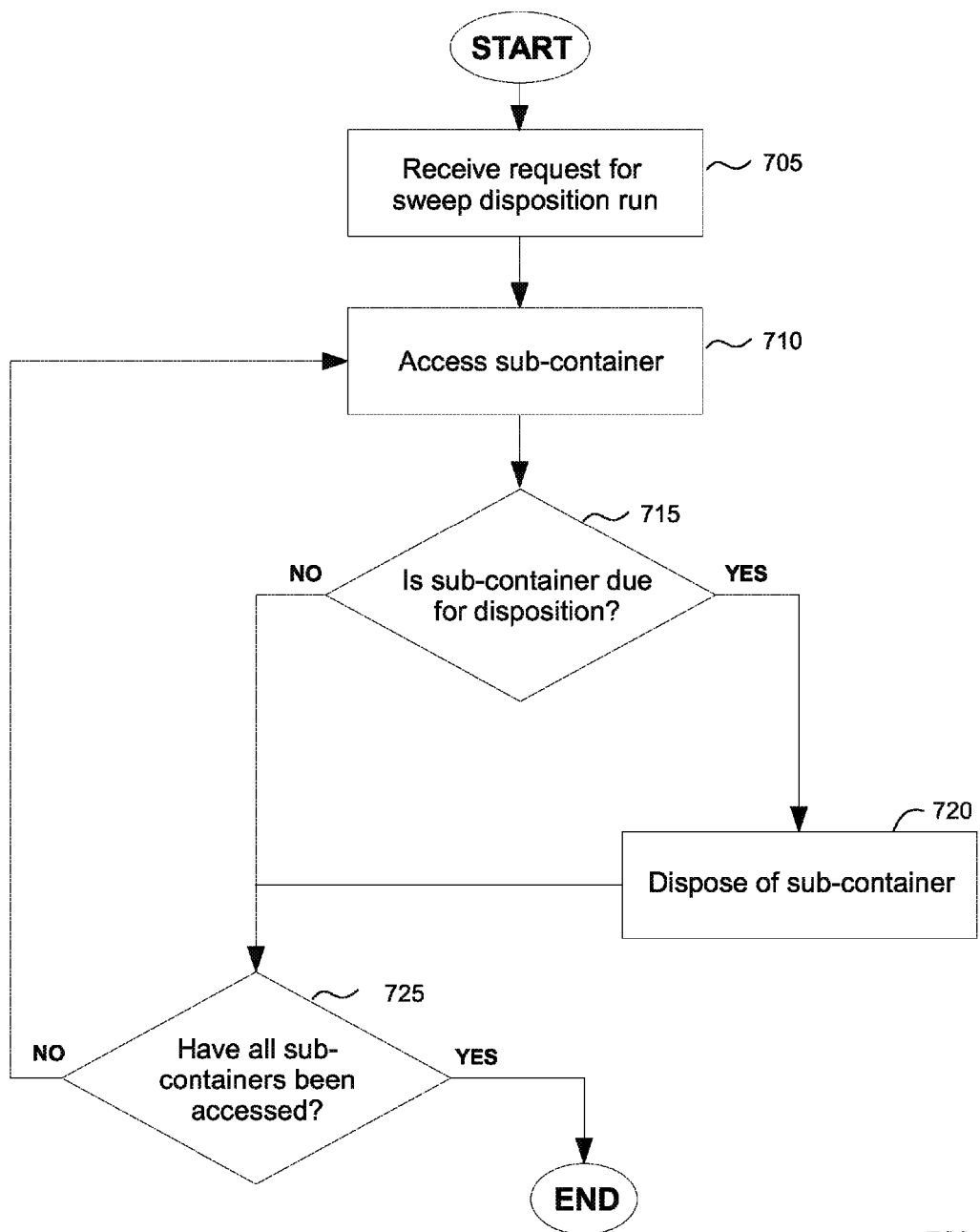
FIG. 7 illustrates a method for disposing of records in a container structure, according to one embodiment of the invention.

FIG. 7 illustrates a method 700 for disposing of records in a container structure, according to one embodiment of the invention. As shown in FIG. 7, the method begins at step 705, where a content management tool receives a request for a sweep disposition run. The sweep disposition run may be a batch process run periodically by the content management tool to dispose of records within sub-containers having lapsed retention periods. A records manager may designate how often a sweep disposition run request is sent to the content management tool.

Once the content management tool receives a request for a sweep disposition run, the tool may iterate through each sub-container of the container structure to determine whether each sub-container should be disposed of. More specifically, at step 710, a sub-container of the container structure is accessed. At step 715 the content management tool determines whether the sub-container accessed at step 710 is due for disposition by analyzing the life cycle parameters specified for the container structure and the current date. More specifically, the content management tool may determine at step 715 whether the retention period of the sub-container has lapsed. For example, if a sub-container accessed at step 710 has a life cycle beginning on Nov. 1, 2009, the life cycle parameters specify a retention period of two years, and the current date is Nov. 11, 2011, then the retention period has lapsed, and thus the content management tool determines at step 715 that the accessed sub-container is due for disposition.

If the content management tool determines at step 715 that the sub-container is not due for disposition, then the method proceeds to step 725. If the content management tool determines that the sub-container is due for disposition, then at step 720 the sub-container is disposed of (i.e., removed from the container structure). At step 725 the content management tool determines whether the content management tool has accessed all sub-containers in the container structure. If all sub-containers have been accessed, then the sweep disposition run is complete, and the method ends. If there are one or more sub-containers still to be accessed, then the method returns to step 710. Steps 710-725 are repeated until the content management tool has accessed all sub-containers of the container structure.

According to the method 700, the content management tool supports simultaneous disposition of a group of records based on a date range. Since a sub-container has a specified retention period, all records within a sub-container may be disposed of collectively according to the life cycle parameters. Thus, the method 700 eliminates the need to dispose of individual records, thus improving system performance.

According the embodiments of the invention, a content management tool of a content management server system may process record requests and may enforce a record retention policy without requiring a user of a client computing system to keep track of the physical location of records or to iterate through records. The embodiments provide an efficient and inexpensive solution for time-based records management.

While the foregoing is directed to embodiments of the present invention, other and further embodiments of the invention may be devised without departing from the basic scope thereof, and the scope thereof is determined by the claims that follow.

What is claimed is:

1. A computer-implemented method for managing records in a content management system, the method comprising:
  receiving a request comprising a record and one or more properties associated with the record;
  determining, from the one or more properties associated with the record, a date;
  based on the date of the record, associating the record with a sub-container of a container structure, wherein the container structure comprises a master container and a plurality of sub-containers, wherein each of the plurality of sub-containers is associated with one or more records each having a date within a specified date range, and wherein the respective date ranges specified for each of the plurality of sub-containers do not overlap; and
  managing disposition of the sub-container based on an associated policy.

2. The computer-implemented method of claim 1, wherein the associated policy specifies a retention period for maintaining the plurality of sub-containers.

3. The computer-implemented method of claim 2, further comprising:
  receiving a sweep disposition run request;
  accessing each sub-container among the plurality of sub-containers; and
  for each sub-container, upon determining that the retention period for the sub-container has lapsed, deleting the sub-container.

4. The computer-implemented method of claim 1, wherein associating the record with a sub-container comprises:
  evaluating the date of the record to determine whether the date is valid;
  upon determining that the date of the record is invalid, associating the record with a transit sub-container among the plurality of sub-containers; and
  upon determining that the date of the record is valid:
    associating the record with any sub-container among the plurality of sub-containers having a date range that includes the date of the record; and
    upon determining that there is no sub-container among the plurality of sub-containers having a date range that includes the date of the record:
      creating a new sub-container among the plurality of sub-containers; and
      associating the record with the new sub-container.

5. The computer-implemented method of claim 1, further comprising:
  receiving an update request specifying updates for at least one of the one or more properties associated with the record;
  evaluating the update request to determine whether a new date is associated with the record;
  upon determining that a new date is associated with the record:
    evaluating the record to determine whether the record is associated with a transit sub-container among the plurality of sub-containers;
    upon determining that the record is associated with a transit sub-container:
      evaluating the new date to determine whether the new date is valid; and
      upon determining that the new date is valid, re-associating the record with another sub-container among the plurality of sub-containers; and upon determining that the record is not associated with a transit sub-container:
  evaluating the new date to determine whether the new date is outside of the date range specified for the sub-container associated with the record; and
  upon determining that the new date is outside of the date range specified for the sub-container associated with the record, re-associating the record with another sub-container among the plurality of sub-containers.

6. The computer-implemented method of claim 1, further comprising:
  receiving a browse request;
  upon determining that the browse request references the master container, returning each record associated with each of the plurality of sub-containers; and
  upon determining that the browse request references a sub-container among the plurality of sub-containers, returning each record associated with the referenced sub-container.

7. The computer-implemented method of claim 1, further comprising:
  storing the record in a record repository associated with the content management system.

8. The computer-implemented method of claim 1, wherein the record comprises a text document.

9. A computer-readable storage medium storing an application, which, when executed on a processor, performs an operation for managing records in a content management system, the operation comprising:
  receiving a request comprising a record and one or more properties associated with the record;
  determining, from the one or more properties associated with the record, a date;
  based on the date of the record, associating the record with a sub-container of a container structure, wherein the container structure comprises a master container and a plurality of sub-containers, wherein each of the plurality of sub-containers is associated with one or more records each having a date within a specified date range, and wherein the respective date ranges specified for each of the plurality of sub-containers do not overlap; and
  managing disposition of the sub-container based on an associated policy.

10. The computer-readable storage medium of claim 9, wherein the associated policy specifies a retention period for maintaining each of the plurality of sub-containers.

11. The computer-readable storage medium of claim 10, wherein the operation further comprises:
  receiving a sweep disposition run request;
  accessing each sub-container among the plurality of sub-containers; and
  for each sub-container, upon determining that the retention period for the sub-container has lapsed, deleting the sub-container.

12. The computer-readable storage medium of claim 9, wherein associating the record with a sub-container comprises:
  evaluating the date of the record to determine whether the date is valid;
  upon determining that the date of the record is invalid, associating the record with a transit sub-container among the plurality of sub-containers; and
  upon determining that the date of the record is valid:
    associating the record with any sub-container among the plurality of sub-containers having a date range that includes the date of the record; and
    upon determining that there is no sub-container among the plurality of sub-containers having a date range that includes the date of the record:
      creating a new sub-container among the plurality of sub-containers; and
      associating the record with the new sub-container.

13. The computer-readable storage medium of claim 9, wherein the operation further comprises:
  receiving an update request specifying updates for at least one of the one or more properties associated with the record;
  evaluating the update request to determine whether a new date is associated with the record;
  upon determining that a new date is associated with the record:
    evaluating the record to determine whether the record is associated with a transit sub-container among the plurality of sub-containers;
    upon determining that the record is associated with a transit sub-container:
      evaluating the new date to determine whether the new date is valid; and
      upon determining that the new date is valid, re-associating the record with another sub-container among the plurality of sub-containers; and
    upon determining that the record is not associated with a transit sub-container:
      evaluating the new date to determine whether the new date is outside of the date range specified for the sub-container associated with the record; and
      upon determining that the new date is outside of the date range specified for the sub-container associated with the record, re-associating the record with another sub-container among the plurality of sub-containers.

14. The computer-readable storage medium of claim 9, wherein the operation further comprises:
  storing the record in a record repository associated with the content management system.

15. A system, comprising:
  a processor; and
  a memory storing a content management application program, which, when executed on the processor, performs an operation for managing records in a content management system, the operation comprising:
    receiving a request comprising a record and one or more properties associated with the record;
    determining, from the one or more properties associated with the record, a date;
    based on the date of the record, associating the record with a sub-container of a container structure, wherein the container structure comprises a master container and a plurality of sub-containers, wherein each of the plurality of sub-containers is associated with one or more records each having a date within a specified date range, and wherein the respective date ranges specified for each of the plurality of sub-containers do not overlap; and
    managing disposition of the sub-container based on an associated policy.

16. The system of claim 15, wherein the associated policy specifies a retention period for maintaining each of the plurality of sub-containers.

17. The system of claim 16, wherein the operation further comprises:
  receiving a sweep disposition run request;

accessing each sub-container among the plurality of sub-containers; and for each sub-container, upon determining that the retention period for the sub-container has lapsed, deleting the sub-container.

18. The system of claim 15, wherein associating the record with a sub-container comprises:

evaluating the date of the record to determine whether the date is valid;

upon determining that the date of the record is invalid, associating the record with a transit sub-container among the plurality of sub-containers; and upon determining that the date of the record is valid:

associating the record with any sub-container among the plurality of sub-containers having a date range that includes the date of the record; and upon determining that there is no sub-container among the plurality of sub-containers having a date range that includes the date of the record:

creating a new sub-container among the plurality of sub-containers; and associating the record with the new sub-container.

19. The system of claim 15, wherein the operation further comprises:

receiving an update request specifying updates for at least one of the one or more properties associated with the record;

evaluating the update request to determine whether a new date is associated with the record;

upon determining that a new date is associated with the record:

evaluating the record to determine whether the record is associated with a transit sub-container among the plurality of sub-containers;

upon determining that the record is associated with a transit sub-container:

evaluating the new date to determine whether the new date is valid; and upon determining that the new date is valid, re-associating the record with another sub-container among the plurality of sub-containers; and upon determining that the record is not associated with a transit sub-container:

evaluating the new date to determine whether the new date is outside of the date range specified for the sub-container associated with the record; and upon determining that the new date is outside of the date range specified for the sub-container associated with the record, re-associating the record with another sub-container among the plurality of sub-containers.

20. The system of claim 15, wherein the operation further comprises:

receiving a browse request;

upon determining that the browse request references the master container, returning each record associated with each of the plurality of sub-containers; and upon determining that the browse request references a sub-container among the plurality of sub-containers, returning each record associated with the referenced sub-container.

21. The system of claim 15, wherein the operation further comprises:

storing the record in a record repository associated with the content management system.

22. A computer-readable storage medium storing an application, which, when executed on a processor, performs an operation for managing records in a content management system, the operation comprising:

receiving a request comprising a record and one or more properties associated with the record;

determining, from the one or more properties associated with the record, a date;

based on the date of the record, associating the record with a sub-container of a container structure, wherein the container structure comprises a master container and a plurality of sub-containers;

managing disposition of the sub-container based on an associated policy;

receiving a browse request;

upon determining that the browse request references the master container, returning each record associated with each of the plurality of sub-containers; and upon determining that the browse request references a sub-container among the plurality of sub-containers, returning each record associated with the referenced sub-container.

* * * * *